(No Model.)
A. E. DOLBEAR.
MODE OF ELECTRIC COMMUNICATION.
No. 350,299. Patented Oct. 5, 1886.
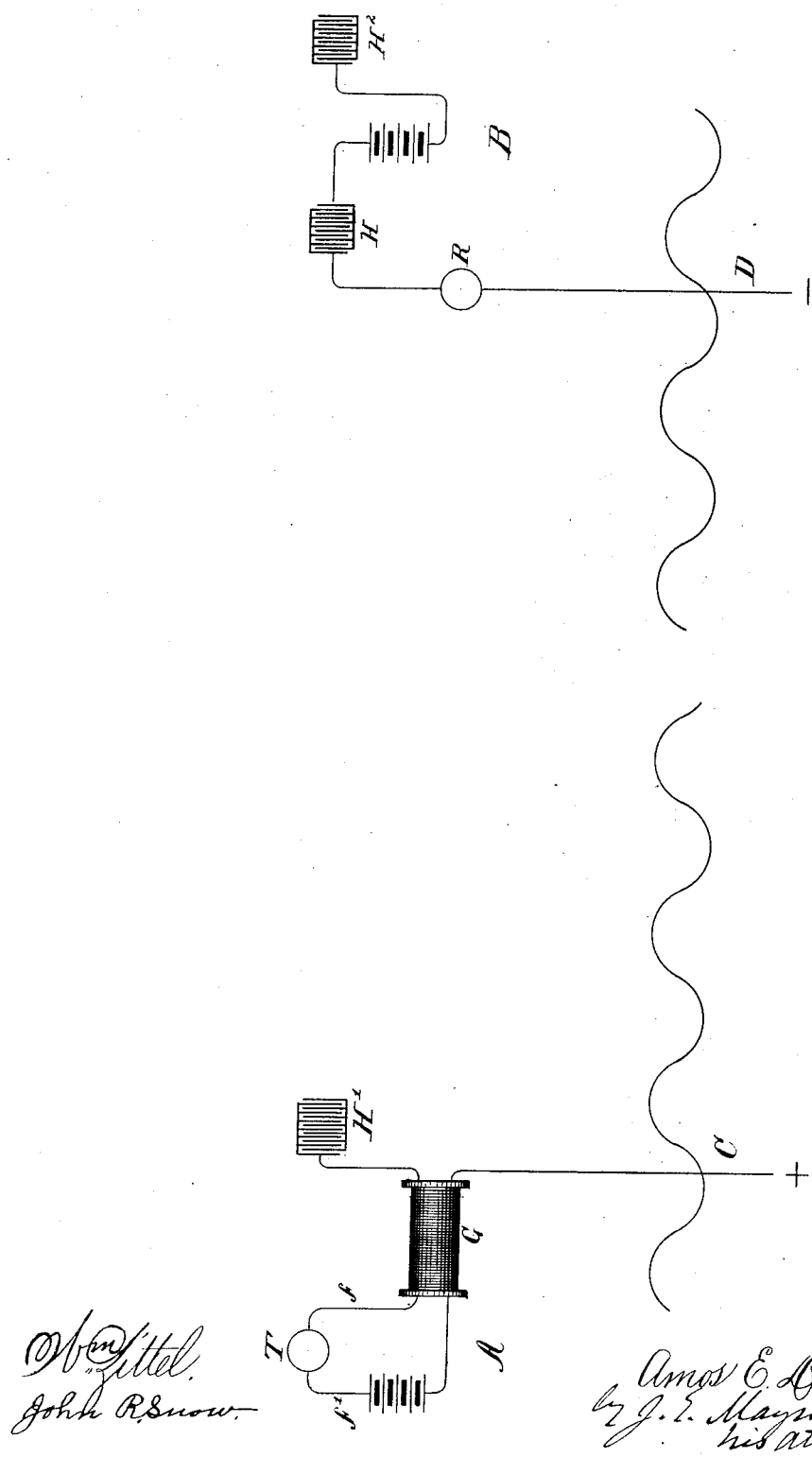

UNITED STATES PATENT OFFICE.

AMOS EMERSON DOLBEAR, OF SOMERVILLE, MASSACHUSETTS, ASSIGNOR, BY MESNE ASSIGNMENTS, TO THE DOLBEAR ELECTRIC TELEPHONE COMPANY, OF NEW JERSEY.

MODE OF ELECTRIC COMMUNICATION.

SPECIFICATION forming part of Letters Patent No. 350,299, dated October 5, 1886.

Application filed March 24, 1882. Serial No. 56,584. (No model.)

*To all whom it may concern:*

Be it known that I, AMOS EMERSON DOLBEAR, of Somerville, in the county of Middlesex and State of Massachusetts, have invented a new Mode of Electric Communication, of which the following is a full, clear, concise, and exact description, reference being had to the accompanying diagram, forming a part hereof.

My invention relates to establishing electric communication between two or more places without the use of a wire or other like conductor; and it consists in connecting the transmitting-instrument with a ground the potential of which is considerably above the normal, and the receiving-instrument with a ground the potential of which is considerably below the normal, the result being that an impulse from the transmitter sufficient to cause the receiver to give intelligible signals is transmitted through the earth without the need of any circuit, such as has heretofore been deemed essential.

In the diagram, A represents one place, (say Tuft's college,) and B a distant place, (say my residence.)

C is a wire leading into the ground at A, and D a wire leading into the ground at B.

G is a secondary coil, one convolution of which is cut, the ends thus formed being connected with the poles of the battery $f'$, which has a number of cells sufficient to establish in the wire C, which is connected with one terminal of the secondary coil G, an electro-motive force of, say, one hundred volts. G in this instance also represents an induction-coil, T being a michrophone-transmitter, $f$ its primary circuit, and $f'$ its battery—that is, the battery $f'$ not only furnishes the current for the primary circuit, but also charges or electrifies the secondary coil G and its terminals C and H'.

Now, if words be spoken in proximity to transmitter T, the vibration of its diaphragm will disturb the electric condition of the coil G, and thereby vary the potential of the ground at A, and the variations of the potential at A will cause corresponding variations of the potential of the ground at B, and the receiver R at B will reproduce the words spoken in proximity to transmitter T, as if the wires C D were in contact or connected by a third wire. Electric communication may be thus established between points certainly more than half a mile apart; but how much farther I cannot now say.

There are various well-known ways of electrifying the wire C to a positive potential far in excess of a hundred volts and the wire D to a negative potential far in excess of a hundred volts.

In the diagram, H H' H² represent condensers, the condenser H' being properly charged to give the desired effect. The condensers H and H² are not essential, but are of some benefit; nor is the condenser H' essential when the secondary G is otherwise charged. I prefer to charge all these condensers, as it is of prime importance to keep the grounds of wires C and D oppositely electrified, and while, as is obvious, this may be done by either the batteries or the condensers, I prefer to use both.

The main difficulty in utilizing my invention on a large scale is that when there are many spots corresponding to A and B signals transmitted from any A will go to the nearest B, or to several B's, depending upon proximity and other causes. One method of obviating this difficulty is to use a given A only during a certain assigned time for communicating with a certain B, the particular B being arranged to receive communications only during the assigned time. Thus, if there were ten B's within a given area, then the first B might be used for the first hour, the second B for the next hour, and so on, and the first A for the first five minutes of the first hour, the second A for the next five minutes, and so on, so that either one of the A's might have free communication with the first B, each for its assigned time during the first hour, and either A with the second B, each for its assigned five minutes of the second hour, and so on.

In practice there will be of course both a receiver and transmitter at A and B, proper switches being used to bring either into use, as will be well understood without description.

I have spoken only of telephone-instruments, as these give the best results; but any electric instruments may be used capable of utilizing the currents passing through the earth from C to D, and the strength of such currents can be largely increased by increasing the positive potential of C and the negative potential of D. It will also be obvious that if the end of coil G (shown in the diagram as connected with one armature of condenser H') be grounded, and the end shown grounded be connected with the condenser, then C will be minus, and D must therefore be made plus.

What I claim is—

The art above described of communicating by electricity, consisting in first establishing a positive potential at one ground and a negative at another; secondly, varying the potential of one ground by means of transmitting apparatus, whereby the potential of the other ground is varied; and, lastly, operating receiving apparatus by the potential so varied, all substantially as described.

AMOS EMERSON DOLBEAR.

Witnesses:
G. B. MAYNADIER,
JOHN R. SNOW.